(12) United States Patent
Nagano (10) Patent No.: US 11,089,200 B2
(45) Date of Patent: Aug. 10, 2021

(54) LENS APPARATUS, IMAGING APPARATUS AND CAMERA SYSTEM

(71) Applicant: CANON KABUSHIKI KAISHA, Tokyo (JP)

(72) Inventor: Toshimune Nagano, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/207,513

(22) Filed: Dec. 3, 2018

(65) Prior Publication Data
US 2019/0199912 A1  Jun. 27, 2019

(30) Foreign Application Priority Data
Dec. 22, 2017  (JP) .............................. JP2017-246911

(51) Int. Cl.
| H04N 5/232 | (2006.01) |
| H04N 5/225 | (2006.01) |
| G02B 7/08 | (2021.01) |
| G02B 27/64 | (2006.01) |
| G02B 27/00 | (2006.01) |

(52) U.S. Cl.
CPC ........... *H04N 5/23212* (2013.01); *G02B 7/08* (2013.01); *G02B 27/0075* (2013.01); *G02B 27/646* (2013.01); *H04N 5/2254* (2013.01); *H04N 5/23293* (2013.01)

(58) Field of Classification Search
CPC .......... G02B 7/04–105; G02B 7/28–40; G02B 7/09; G02B 7/102; G03B 3/00–12; G03B 13/36

USPC ...... 359/698, 696; 348/345–357; 396/77–78, 396/79–83, 89–152, 345–357
See application file for complete search history.

(56) References Cited

U.S. PATENT DOCUMENTS

| 8,792,018 | B2 | 7/2014 | Matsuzawa et al. | |
| 2007/0003268 | A1* | 1/2007 | Uchiyama | G03B 13/36 396/125 |
| 2008/0165272 | A1* | 7/2008 | Toguchi | H04N 5/23212 348/348 |
| 2011/0019294 | A1* | 1/2011 | Strong | G03B 5/06 359/823 |
| 2013/0258171 | A1* | 10/2013 | Kikuchi | H04N 5/23212 348/353 |
| 2017/0192247 | A1 | 7/2017 | Okuda | |
| 2017/0353665 | A1* | 12/2017 | Sato | H04N 5/2327 |

FOREIGN PATENT DOCUMENTS

JP  2012141516 A  7/2012

* cited by examiner

*Primary Examiner* — Xi Wang
(74) *Attorney, Agent, or Firm* — Rossi, Kimms & McDowell, LLP (57) ABSTRACT

According to an aspect of the invention, a lens apparatus includes: an imaging optical system including lenses; a focus position change unit changing a position of a focal plane by changing a focus position based on driving of at least one of the lenses; an operation unit operating the driving of the at least one of the lenses by the focus position change unit; an operation amount detection unit detecting an operation amount of the operation unit; a tilt driving unit changing a tilt of the focal plane by driving the imaging optical system; and a tilt amount detection unit detecting a tilt amount that is a drive direction and a drive amount of the imaging optical system by the tilt driving unit.

19 Claims, 8 Drawing Sheets

| | Inclination amount − Initial inclination : t−t0 (°) | | | |
|---|---|---|---|---|
| | t−t0≦0 | 0<t−t0≦20 | 20<t−t0≦45 | 45<t−t0≦90 |
| Focus position change coefficient | 1 | 0.75 | 0.5 | 0.25 |

LENS APPARATUS, IMAGING APPARATUS AND CAMERA SYSTEM

BACKGROUND OF THE INVENTION

Field of the Invention

The present invention relates to a lens apparatus, an imaging apparatus and a camera system.

Description of the Related Art

An imaging apparatus that inclines a lens or an imaging element by a tilt mechanism, changes a depth of field, and performs photographing is known. In such an imaging apparatus, in a case where photographing is performed with a small depth of field, there is a problem that it may be difficult to adjust a focus because a focus range becomes narrow. In U.S. Pat. No. 8,792,018, in an imaging apparatus having such a tilt mechanism, focus control is automatically performed by using a tilt angle of a lens unit in a case where a tilt operation for inclining the lens unit is performed.

However, in the imaging apparatus disclosed in U.S. Pat. No. 8,792,018, there is no countermeasure for manually performing the focus control at a photographing time at which the lens unit is inclined, and it is still difficult to manually adjust the focus.

SUMMARY OF THE INVENTION

The present invention provides a lens apparatus, an imaging apparatus, and a camera system that facilitate manual focus adjustment.

According to an aspect of the invention, a lens apparatus comprises: an imaging optical system including a plurality of lenses; a focus position change unit configured to change a position of a focal plane by changing a focus position based on driving of at least one of the plurality of lenses; an operation unit configured to operate the driving of the at least one of the lenses by the focus position change unit; an operation amount detection unit configured to detect an operation amount of the operation unit; a tilt driving unit configured to change a tilt of the focal plane by driving the imaging optical system so that the imaging optical system is inclined; a tilt amount detection unit configured to detect a tilt amount that is a drive direction and a drive amount of the imaging optical system by the tilt driving unit; and a control unit configured to change a unit drive amount with respect to the operation amount in the focus position change unit by using the tilt amount.

Further features of the present invention will become apparent from the following description of exemplary embodiments with reference to the attached drawings.

DESCRIPTION OF THE EMBODIMENTS

Hereinafter, an exemplary embodiment of the present invention will be described with reference to the drawings and the like.

First Exemplary Embodiment

Figure 1:
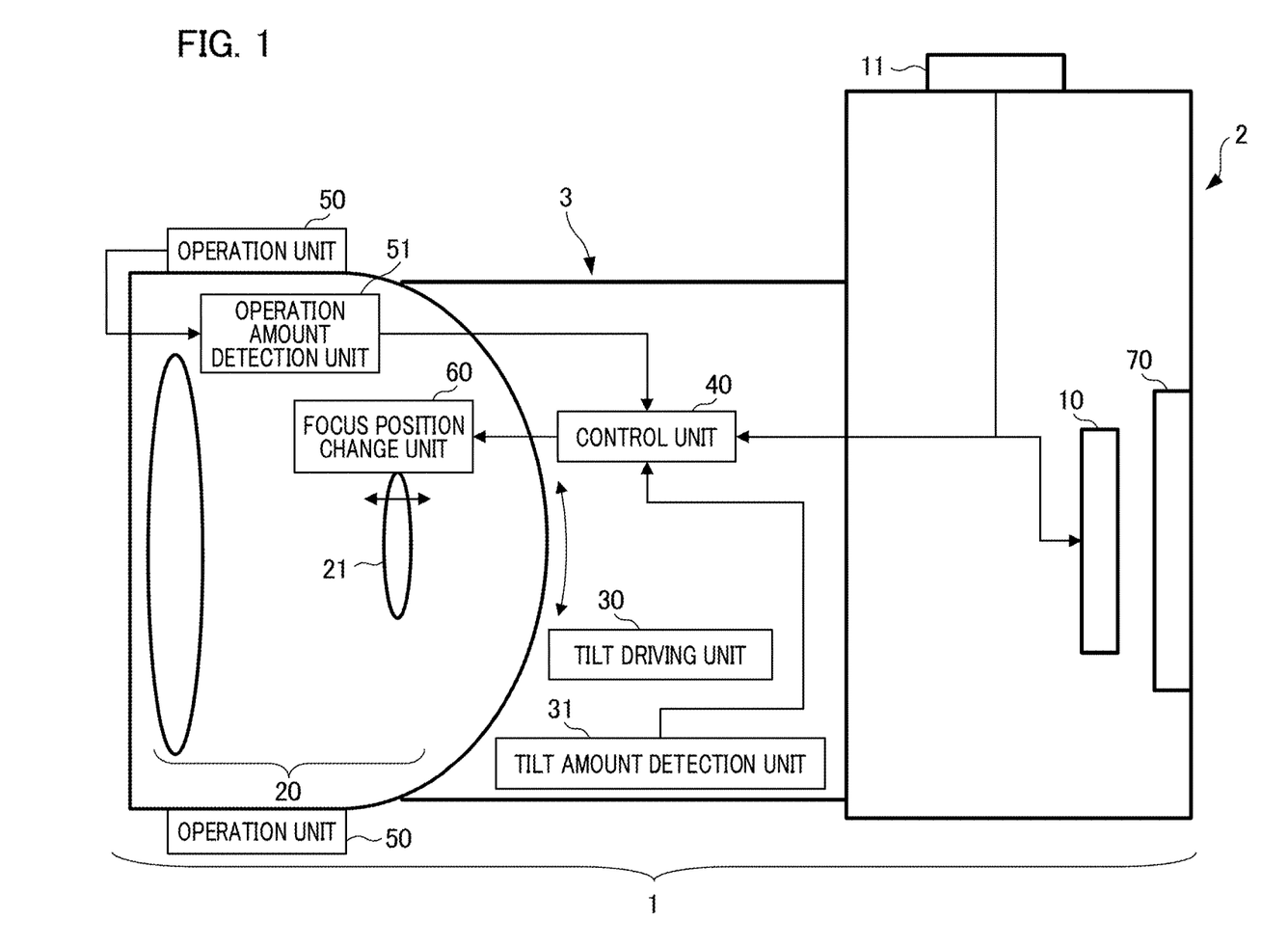
FIG. 1 is a block diagram illustrating a configuration of a camera system including a lens apparatus according to a first exemplary embodiment.

FIG. 1 is a block diagram illustrating a configuration of a camera system including a lens apparatus according to a first exemplary embodiment. In the present exemplary embodiment, a camera system 1 including a lens apparatus 3 will be described as an example, but the present invention is also able to be applied to an imaging apparatus in which a lens apparatus and a camera body are integrated. The camera system 1 includes a camera body 2 and the lens apparatus 3. The camera body 2 detachably holds the lens apparatus 3. The camera body 2 has an imaging element 10.

The imaging element 10 performs photoelectrical conversion to convert a subject image formed by an optical system 20 that will be described later into an electrical signal and acquires image information. The imaging element 10 is controlled so as to be able to photograph by a control unit 40 that will be described later. Regarding a specific structure, since an existing method is able to be used, descriptions thereof will be omitted, but the imaging element 10 may have a configuration in which the imaging element 10 captures an image by a user pressing a shutter button 11.

The shutter button 11 is configured to be able to be pressed in two stages, and performs auto focus (AF) at a first stage and captures an image at a second stage. In the present exemplary embodiment, contrast AF is used as an example of the AF method. In the contrast AF, while driving a focus lens 21, an AF evaluation value based on image data accumulated in the imaging element 10 is acquired, and a focus position is specified on the basis of the AF evaluation value and focus lens position information corresponding to the AF evaluation value.

Note that the AF method is not limited thereto, and a phase difference AF in which a mirror is provided and AF is performed using a dedicated sensor may be used. In addition, in the present exemplary embodiment, as an example, a part of the optical system 20 is driven to change the focus position, but the focus position may be changed by driving the imaging element 10.

The lens apparatus 3 includes the optical system 20, a tilt driving unit 30, a control unit 40, an operation unit 50, and a focus position change unit 60. The optical system 20 (an imaging optical system) is a plurality of lenses and includes a focus lens 21.

The tilt driving unit 30 rotates the optical system 20 by a predetermined amount about an axis perpendicular to an optical axis as a rotation center, thereby changing a tilt of the focal plane with respect to an imaging plane. Note that, here, the focal plane is a surface on a subject side which the optical system 20 is focused. For example, the tilt driving unit 30 may be a well-known actuator such as a DC motor or an ultrasonic motor.

In addition, the tilt driving unit 30 includes a revolving unit that rotates the optical system 20 about the optical axis. Note that, in the present exemplary embodiment, the optical system 20 is driven, but the imaging element 10 may be driven.

A tilt amount due to the tilt driving unit 30 is detected by the tilt amount detection unit 31. At this time, the tilt amount includes a drive direction (a tilt direction) of the optical system 20 and a drive amount (a tilt angle) of the optical system 20. In addition, the tilt amount detection unit 31 is also able to detect a rotation angle of the revolving unit.

A detection method in the tilt amount detection unit 31 may be an existing method. For example, a flexible cable on which a plurality of patterns are drawn may be provided on a fixed side and a brush configured of a conductive material that is able to slide on each pattern may be provided on a movable side. The tilt amount detection unit 31 detects the tilt amount according to a combination when a conductive portion of the plurality of patterns is electrically connected using the brush. Note that a detection method is not limited to this method, and any detection method that detects an absolute position of the optical system 20 may be used. In addition, in a case where the imaging element 10 is driven to change the tilt of the focal plane, the absolute position of the imaging element 10 may be detected. In this case, the tilt driving unit 30 and the tilt amount detection unit 31 may be provided in the camera body 2.

The operation unit 50 is an operation unit capable of operating the driving by the focus position change unit 60. The operation unit 50 is, for example, in a form of a ring and has a comb teeth structure. In the operation unit 50, two photo-interrupters are provided so as to sandwich comb teeth between a light exiting side and a light incident side. An operation amount in the operation unit 50 is detected by an operation amount detection section 51. The operation amount detection unit 51 detects the rotation direction and the rotation amount from a signal of the two photo interrupters provided in the operation unit 50. That is, the operation amount includes the rotation direction and rotation amount of the operation unit 50. Note that the operation unit 50 and the operation amount detection unit 51 are not limited to having such a configuration, and may be of a lever type.

The control unit 40 is, for example, a micro-processing unit (MPU) and performs various controls in the camera system 1 using electrical signals. In the present exemplary embodiment, the control unit 40 provided in the lens apparatus 3 is used, but the MPU provided in the camera body 2 may be used for control. In addition, separate MPUs may be used in the camera body 2 and the lens apparatus 3.

The control unit 40 changes a unit drive amount of the focus lens 21 with respect to the operation amount by using the tilt amount. In addition, the control unit 40 calculates the tilt of the focal plane and the subject plane inclined by the tilt driving unit 30. The control unit 40 calculates the tilt of the focal plane and the subject plane by the following two methods. A first method is a method of calculating the tilt using the tilt amount detected in the tilt amount detection unit 31 and the subject plane obtained by a photographed image. Details of a method of calculating the subject plane will be described later.

A second method is a method performed by using an input unit 70 provided in the camera system 1. The second method is a method of calculating a selection subject plane from three points that are arbitrarily selected by the user in the photographed image and calculating the tilt amount from the tilt amount and the selection subject plane. The input unit 70 is configured of, for example, a touch panel capable of displaying the photographed image and arbitrarily selecting a point in the photographed image. At this time, distances between the selected three points is obtained by driving the focus lens 21 using the focus position change unit 60. Thus, a tilt direction and a tilt angle of the subject plane with respect to the imaging element 10 are able to be determined. Note that it is also possible to use either the first method or the second method, or it may be possible to perform detection using a difference between the tilt amount and a focus movement amount in the photographed image in other methods.

The focus position change unit 60 changes a position of the focal plane by driving at least one of the focus lenses 21 and changing a focus position. The focus position change unit 60 is controlled by the control unit 40. The focus position change unit 60 drives the focus lens 21 on the basis of the operation amount of the operation unit 50 detected by the operation amount detection unit 51, the focal plane calculated by the control unit 40, and the tilt of the subject plane.

The focus position change unit 60 is configured of a tubular guide cylinder in which an annular ultrasonic motor and a rectilinear groove are formed, and a tubular cam barrel formed with a cam locus. The cam locus is formed so that an amount of change in focus position per operation amount is uniform. Since the detailed structure is the same as an existing structure, descriptions thereof are omitted, but the focus lens 21 is held by the rectilinear groove of the guide cylinder and a cam of the cam barrel by three cam followers. Since the guide cylinder is fixed to the cam barrel so that the guide cylinder is not able to be rotated and the cam barrel rotates in conjunction with the annular ultrasonic motor, it is possible to drive the focus lens 21 in a direction of the optical axis using the annular ultrasonic motor.

Note that the number of focus lenses 21 is not limited to one and may be plural. In addition, in this case, respective lenses may be moved differently by cams of a plurality of types without the same movements being performed. In the present exemplary embodiment, as an example of the focus position change unit 60, an example in which the annular ultrasonic motor is used is described, but driving may be performed by a stepping motor or a voice coil motor. In addition, a method of changing the focus position on a side of the optical system 20 by using the focus lens 21 is described, but the focus position may be changed by the imaging element 10.

Figure 2:
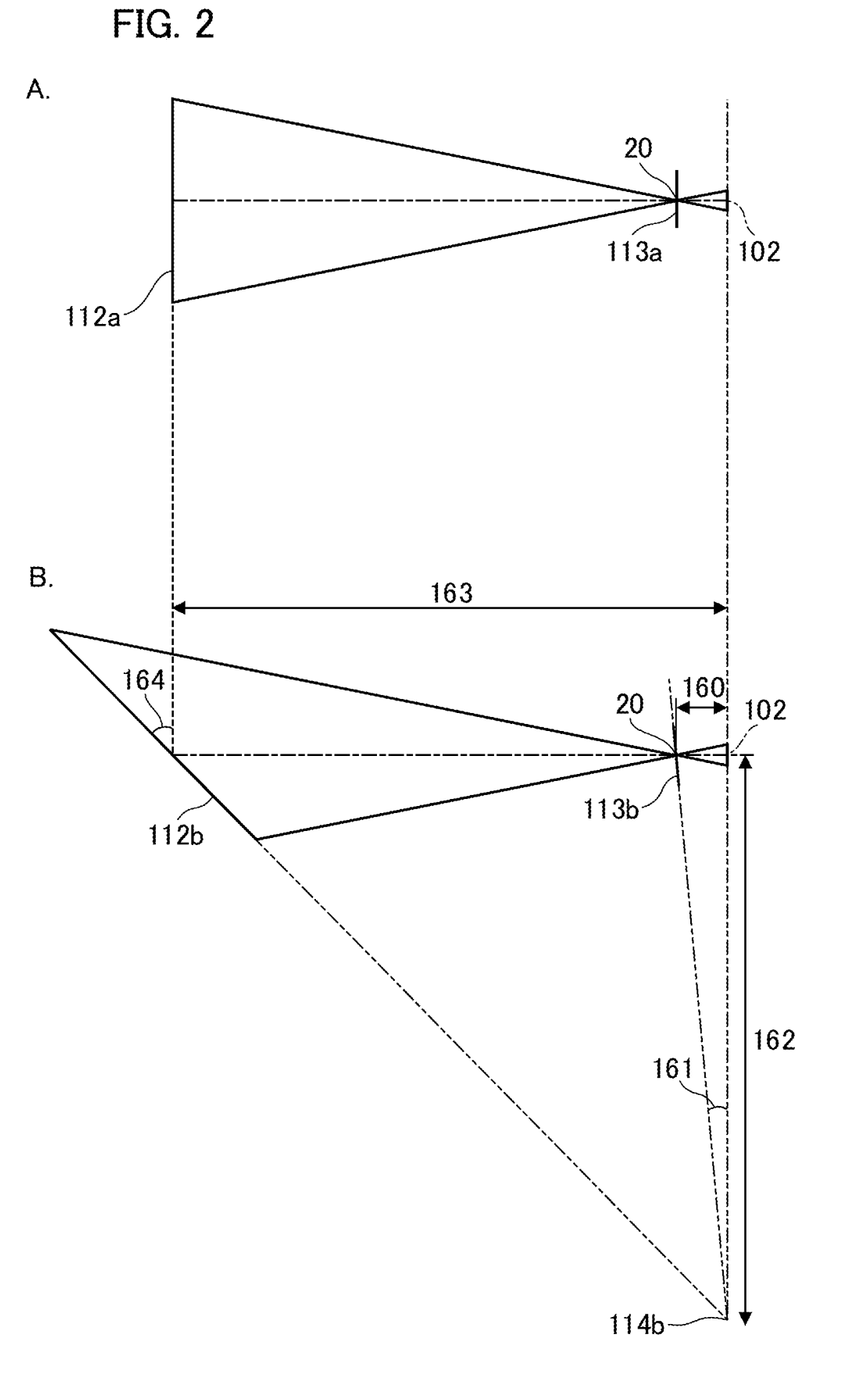
FIG. 2 is diagrams for explaining a principle of Scheimpflug.

In the configuration described above, before describing a process of the control unit 40, a principle of Scheimpflug will be described. FIG. 2 is a diagram for explaining the principle of Scheimpflug. When the optical axis and the imaging element 10 are inclined in the optical system 20, a focus range in which a focus on a subject side is adjusted is determined according to the principle of Scheimpflug. FIG. 2A shows a focal plane 112a in a case where a main surface 113a of the optical system 20 is not inclined with respect to the imaging surface 102. FIG. 2B shows a focal plane 112b in a case where the main surface 113b of the optical system 20 is inclined with respect to the imaging surface 102.

The principle of Scheimpflug means that the focal plane 112b also passes through an intersection point 114b when the imaging surface 102 and the main surface 113b of the optical system 20 intersect with each other at a certain intersection point 114b on a straight line as shown in FIG. 2B. As described above, it is possible to calculate the focal plane by a focus distance, the tilt amount, and a focus position of the optical system 20.

Figure 3A:
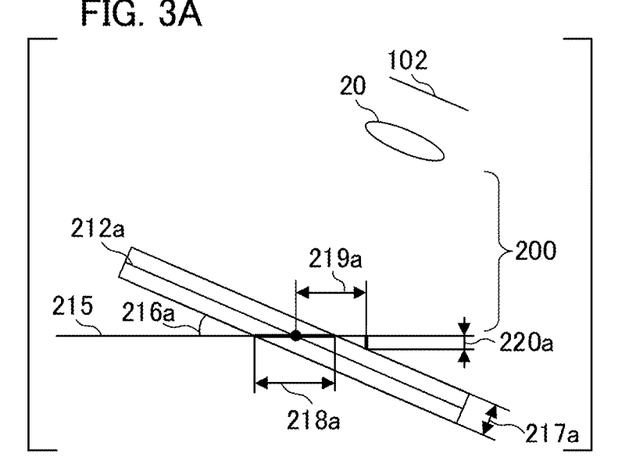
FIGS. 3A to 3C are diagrams illustrating a relationship between a focal plane and a depth of field when an optical system is inclined.
Figure 3B:
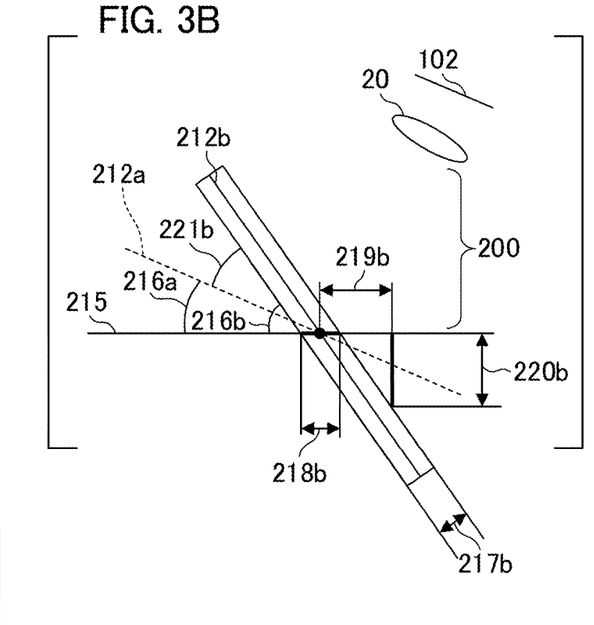
Figure 3C:
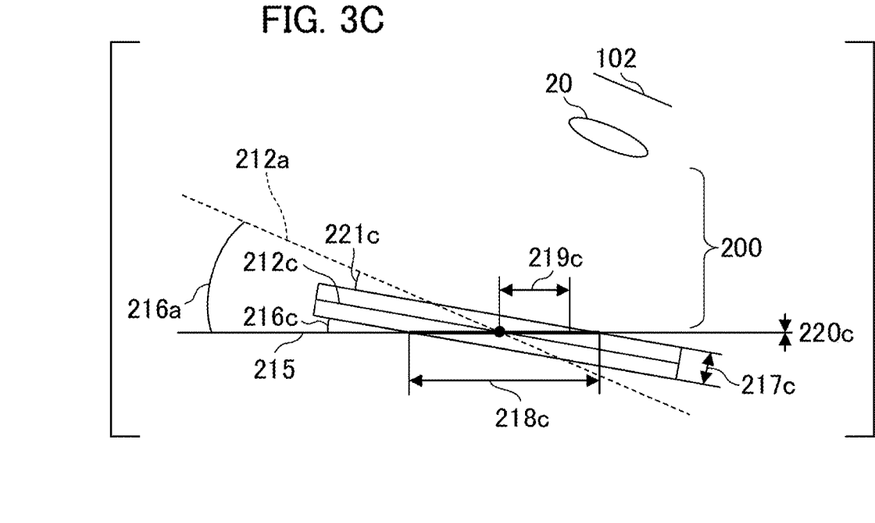

FIG. 3 is a diagram illustrating a relationship between the focal plane and a depth of field when the optical system 20 is inclined. FIG. 3A shows a state (hereinafter, referred to as a non-tilt state) in which the optical system 20 is not inclined with respect to the imaging surface 102. FIG. 3B shows a state (hereinafter, referred to as a reverse tilt state) in which the optical system 20 is inclined in a direction in which the focus range narrows with respect to a depth of the subject with respect to the imaging surface 102. FIG. 3C shows a state (referred to as a tilt state) in which the optical system is inclined in a direction in which the focus range widens with respect to the depth of the subject with respect to the imaging surface 102.

In FIG. 3, reference numerals 212a, 212b, and 212c are focal planes that are in focus. Reference numeral 215 is a subject plane. The subject plane 215 is a subject in a case where the subject is viewed as a plane. Reference numerals 216a, 216b, and 216c are angles formed by the focal planes and the subject planes. Reference numerals 217a, 217b, and 217c are the depths of field of the optical system 20. Reference numerals 218a, 218b, and 218c denote the focus range in the subject plane 215. Reference numerals 220a, 220b, and 220c denote focus deviation amounts of at points at distances 219a, 219b, and 219c away. In addition, reference numeral 221b or 221c is a change in angle of the tilt of the focal plane when the optical system 20 is set in the reverse tilt state or the tilt state. At this time, the change angles 221b and 221c are a value obtained by subtracting the angle 216a from the angle 216b and a value obtained by subtracting the angle 216a from the angle 216c, respectively.

The focus range 218a in the non-tilt state is able to be obtained from the following calculation formula.

$$218a = 217a / \sin(216a) \quad \text{(Formula 1)}$$

Further, the defocus amount 220a at the time when it is the distance 219a away can be obtained by the following formula:

$$220a = (219a - (217a/2)/\sin(216a)) \times \tan(216a) \quad \text{(Formula 2)}$$

As shown in FIG. 3B, by setting the focal plane 212b to be inclined and to be in the reverse tilt state, the focal plane 212b is able to be set to an angle 216b closer to a right angle than the angle 216a with respect to the subject plane 215. At this time, the focus range 218b and the focus deviation amount 220b are able to be obtained from the following calculation formula.

$$218b = 217b / \sin(216b) \quad \text{(Formula 3)}$$

$$220b = (219b - (217b/2)/\sin(216b)) \times \tan(216b) \quad \text{(Formula 3)}$$

In FIGS. 3A and 3B, since the optical system 20 is the same, the depth of field 217a and the depth of field 217b are also the same. Then, the focus range 218b becomes narrower than the focus range 218a. In addition, the focus deviation amount 220b becomes larger than the focus deviation amount 220a. That is, since the focus range is able to be set to be extremely narrow, it is possible to acquire a diorama-like image, but it is difficult to perform focusing due to setting the focus range to be extremely narrow.

On the other hand, as shown in FIG. 3C, by setting the focal plane to be inclined to be in the tilt state, it is possible to cause the focal plane 212c to intersect the subject plane 215 at an angle 216c closer to parallel than the angle 216a. At this time, the focus range 218c and the focus deviation amount 220c are able to be obtained from the following calculation formula.

$$218c = 217c / \sin(216c) \quad \text{(Formula 4)}$$

$$220c = (219c - (217c/2)/\sin(216c)) \times \tan(216c) \quad \text{(Formula 5)}$$

In FIGS. 3A and 3C, since the optical system 20 is the same, the depth of field 217a and the depth of field 217c are also the same. Then, the focus range 218c becomes wider than the focus range 218a. In addition, the focus deviation amount 220c becomes smaller than the focus deviation amount 220a. That is, it is possible to perform focusing in a wider range than in the non-tilt state.

Figure 4:
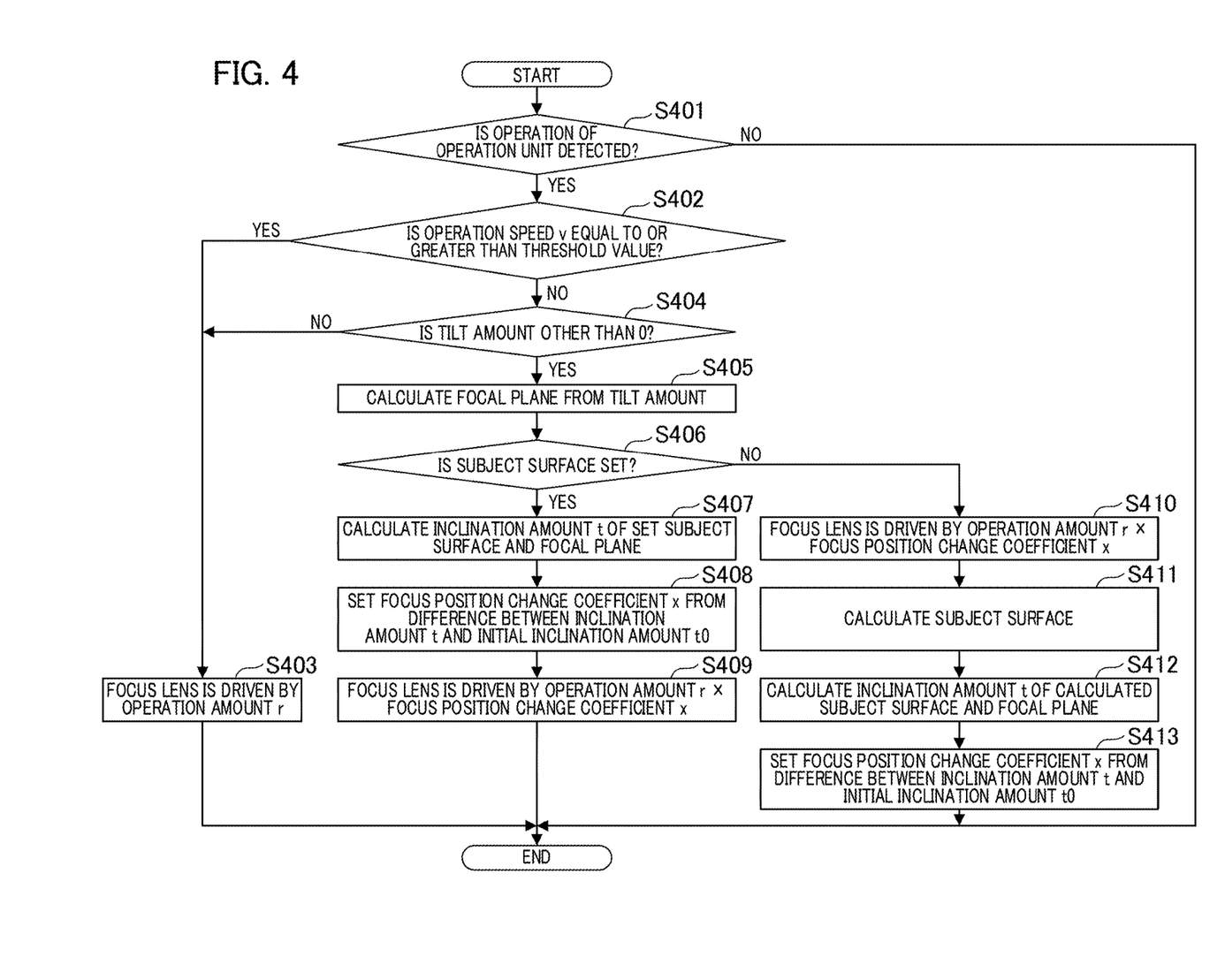
FIG. 4 is a flowchart illustrating a method of control of a focus position change unit by an operation unit.

Next, a method of control of the focus position change unit 60 at a time of manual focus (MF) in which the operation unit 50 is operated by the user will be described. FIG. 4 is a flowchart illustrating the method of control of the focus position change unit by the operation unit. Each flow is mainly executed by control of each unit by the control unit 40.

First, in S401, the control unit 40 detects whether or not the operation unit 50 is being operated. In a case where operation is not detected (No), the process ends without changing the focus position. In a case where operation is detected (Yes), the process proceeds to S402.

In S402, the control unit 40 determines whether the operation speed v of the operated operation unit 50 that is being operated is equal to or greater than a threshold value. In a case where the operation speed v is equal to or greater than the threshold (Yes), the focus position change unit 60 is controlled such that the focus lens 21 is driven by an operation amount r×1, that is, an operation amount r in S403. At this time, it can be said that the unit drive amount of the focus lens 21 with respect to the operation amount r is 1. Note that, in the present exemplary embodiment, for example, the unit drive amount at the time of reference is set to be 1.

In S402, in a case where the operation speed v is less than the threshold value (No), the process proceeds to S404. In S404, the tilt amount is detected by the tilt amount detection unit 31. In S404, in a case where the tilt amount is 0 (No), the focus position change unit 60 is controlled so as to drive the focus lens 21 by the operation amount r (S 403). In a case where the tilt amount is other than 0, the process proceeds to S405. Note that, in the present exemplary embodiment, it is determined whether the tilt amount is other than 0, but a fixed threshold value may be provided.

In S405, the tilt direction and the tilt angle of the focal plane are calculated from the tilt amount, the focus distance, and the focus position of the optical system 20. In addition, the change angle 221b in FIG. 3B and the change angle 221c in FIG. 3C are obtained. At this time, in a space 200 between the optical system 20 and the subject plane, an angle exceeding the angle 216a formed by the focal plane 212a in the non-tilt state and the subject plane 215 is positive, and the angle smaller than the angle 216a is negative. That is, the change angle 221b is positive and the change angle 221c is negative.

Next, in S406, the control unit 40 determines whether or not the subject plane is set. In a case where the subject plane is set (Yes), the process proceeds to S407. In step S407, the control unit 40 calculates the tilt amount t that is the angle formed by the set subject plane 215 and the focal plane. The tilt amount t is an angle of 90 degrees or less. That is, the tilt amount t is the angle 216b in FIG. 3B and the angle 216c in FIG. 3C. The angle 216b and the angle 216c are reference angles for determining a focus position change coefficient x that will be described later.

Figure 5:
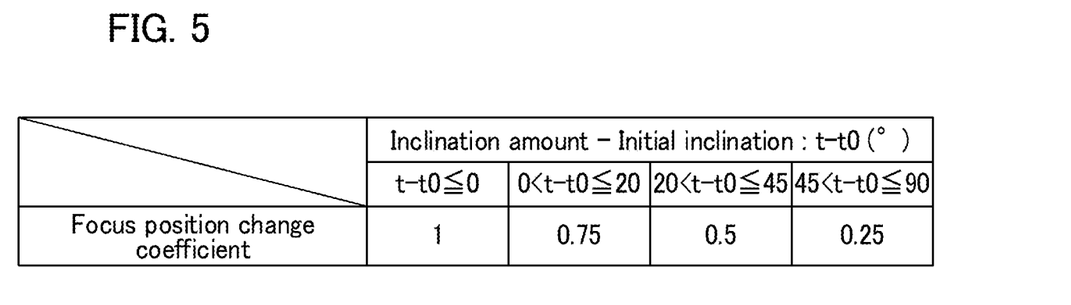
FIG. 5 is a table illustrating a relationship between a difference between an initial tilt amount t0 and a tilt amount t and a focus position change coefficient.

Next, in S408, the focus position change coefficient x is set according to a difference between an initial tilt amount t0 and the tilt amount t. FIG. 5 is a table illustrating a relationship between the difference between the initial tilt amount t0 and the tilt amount t and the focus position change coefficient x. The initial tilt amount t0 is the angle formed by the focal plane 212a and the subject plane 215 in the non-tilt state, and is a reference value. That is, in FIG. 3, the initial tilt amount t0 is the angle 216a, and the initial tilt amount t0 is an absolute value of the angle 216a.

Here, a method of setting the focus position change coefficient x will be described. In a case where the difference obtained by subtracting the initial tilt amount t0 from the tilt amount t is equal to or less than 0 degrees, 1 is added to the focus position change coefficient x. In a case where the difference obtained by subtracting the initial tilt amount t0 from the tilt amount t is greater than 0 degrees and is equal to or less than 20 degrees, 0.75 is added to the focus position change coefficient x. In a case where the difference obtained by subtracting the initial tilt amount t0 from the tilt amount t is greater than 20 degrees and is equal to or less than 45 degrees, 0.5 is added to the focus position change coefficient x. In a case where the difference between the tilt amount t and the initial tilt amount t0 with respect to the initial tilt amount t0 is greater than 45 degrees and is less than 90 degrees, 0.25 is added to the focus position change coefficient x.

That is, for example, in a case where the difference obtained by subtracting the initial tilt amount t0 from the tilt amount t is 30 degrees, the focus position change coefficient x is 0.5. At this time, it can be said that the unit drive amount of the focus lens 21 with respect to the operation amount is 0.5. The unit drive amount becomes a smaller value as the tilt amount t exceeds the reference value and becomes larger. Note that the focus position change coefficient is reset when the camera system 1 is turned on, and is set to 1.

Next, in S409, the focus lens 21 is driven by the operation amount r×the focus position change coefficient x by the focus position change unit 60. It is possible to change the amount of change in focus position according to the focus range of the subject plane 215 by setting the focus position change coefficient to 1 in a case where the difference obtained by subtracting the initial tilt amount t0 from the tilt amount t is equal to or less than 0 and reducing the coefficient according to a magnitude thereof in a case where the difference is greater than 0 as described above. That is, it is possible to facilitate focusing when the focus range of the subject plane set by the user becomes narrow.

Note that the focus position change coefficient is not limited according to this method, and a numerical value and the like may be changed. Also, a process such as changing the focus position change coefficient according to a change in magnification of the depth of field may be performed using the initial tilt amount t0, the tilt amount t, and the depth of field calculated using Formulas 1 and 3, although the processing load does increase.

In S406, in a case where the subject plane 215 is not set, the process proceeds to S410. In S410, the focus lens 21 is driven by the operation amount r×the focus position change coefficient x by the focus position change unit 60. The focus position change coefficient x at this time point is 1 because the focus position change coefficient is reset in a case of a first photographing after turning on the power, and in other cases, the focus position change coefficient is the coefficient used at immediately before photographing.

Figure 6:
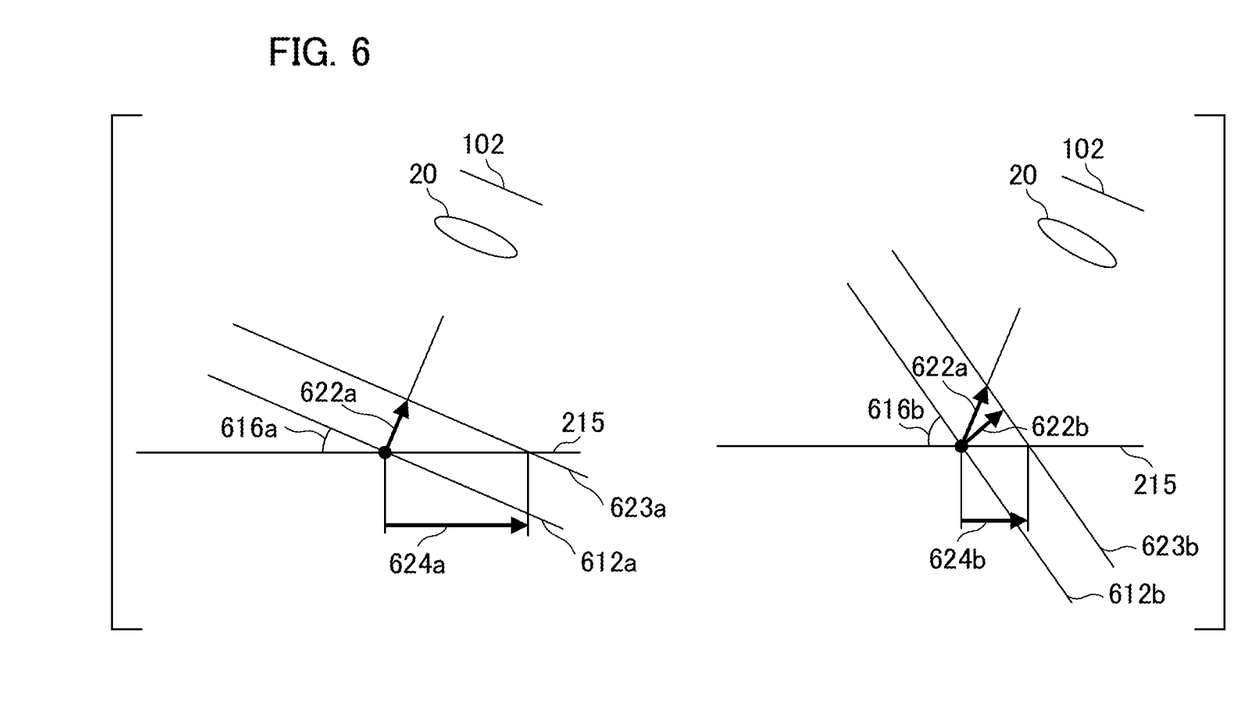
FIG. 6 is diagrams for explaining a method of calculating a subject plane from an amount of change in a focus position on a photographing screen.

Next, in S411, the subject plane 215 is obtained from the amount of change in the focus position on a photographing screen at a time of driving in S410. FIG. 6 is a diagram for explaining a method of calculating the subject plane 215 from the amount of change in the focus position on the photographing screen. FIG. 6A shows a state in which the optical system 20 is not inclined with respect to the imaging element 10, and FIG. 6B shows a state in which the optical system 20 is inclined with respect to the imaging element 10. In FIG. 6, reference numerals 612a and 612b denote focal planes, and reference numerals 616a and 616b denote angles of 90 degrees or less among angles formed by the focal plane and the subject plane. Reference numerals 622a and 622b denote amounts of change in a direction perpendicular to the focal plane when the focus lens 21 is driven by a fixed amount. When the driving amounts of the focus lens 21 are the same, since the directions of change of the focal plane when the optical system 20 is tilted from before tilting are the same, the amount of change 622b in the direction perpendicular to the focusing plane can be obtained from the following calculation formula:

$$622b = 622a \times \cos(616b - 616a) \quad \text{(Formula 6)}$$

At this time, reference numerals 623a and 623b denote the focal planes after the focus lens 21 is moved. In addition, reference numerals 624a and 624b denote movement amounts of a focus movement on the subject plane. At this time, the tilt amounts 616a and 616b of the focal plane and the subject plane are able to be obtained from the following formulas.

$$616a = \arcsin(622a/624a) \quad \text{(Formula 7)}$$

$$616b = \arcsin(622b/624b) \quad \text{(Formula 8)}$$

By Formulas (6) and (8), $$616b = \arcsin((622a \times \cos(616b - 616a))/624b) \quad \text{(Formula 9)}$$

The amount of change 622a is able to be calculated from the drive amount of the focus lens 21. At this time, 616b−616a is equal to the tilt amount of the focal plane by the tilt of the optical system. Therefore, amount of change 622a is able to be obtained from the principle of Scheimpflug shown in FIG. 2B. Specifically, a length 160 on the optical axis of the main surface 103b of the optical system 20 and the imaging surface 102 is obtained by the focus length of the optical system. In addition, a length 162 from a tilt amount angle 161 of the imaging surface 102 and the optical system 20 to the optical axis on the intersection point 114b and the imaging surface 102 is able to be calculated by the following calculation formula.

$$162 = 160/\tan 161 \quad \text{(Formula 10)}$$

In addition, a length 163 on the optical axis of the focal plane 112b and the imaging surface 102 is able to be ascertained from the focus position. At this time, since the tilt of the focal plane before and after the optical system 20 is inclined is equal to the tilt of the imaging surface 102 and the focal plane 112b, a tilt angle 164 of the focal plane by the tilt of the optical system 20 is able to be obtained by the following formula.

$$164 = \arctan(163/162) \quad \text{(Formula 11)}$$

That is, it is possible to calculate 616b−616a in FIG. 6 by performing the same calculation as Formula 11.

Returning to FIGS. 6, 624a and 624b are able to be calculated from a movement distance of the focus position on the imaging element 10 and the focus distance of the optical system 20. That is, since the tilt amounts 616a and 616b of the focal plane and the subject plane in the tilt and reverse tilt state and the non-tilt state are able to be calculated, it is possible to calculate the subject plane from the tilt angle, the focus distance, and the focus position of the optical system 20.

Note that, for detection of the movement amount of the focus position and calculation of the subject plane, a center value of the focus movement amount of the tilt direction and a direction perpendicular to the tilt direction is used. With such a performance, it is possible to more accurately calculate the subject plane even in a case where the subject is not flat. The calculation method is merely an example and is not limited thereto.

Next, in S412, the tilt amount that is the angle between the subject plane and the focal plane calculated in S411 is calculated. In S413, similarly to S408, the focus position change coefficient x is set from the difference between the tilt amount t and the initial tilt amount t0 according to the table of FIG. 5, and control is ended.

It is possible to detect the subject plane when driving the focus lens 21 and change the focus position change coefficient x from next control using the subject plane information by performing control from S410 to S413. Note that, in the present control, the subject plane information is used continuously once the subject plane is detected. However, the subject plane information may be updated each time the focus lens 21 is driven.

With a performance of control described above, it is possible to change the sensitivity to the focus position change of the operation unit 50 according to the tilt amount of the focal plane and the subject plane when the operation unit 50 is operated at a speed less than a predetermined speed. That is, in a case where photographing is performed in the reverse tilt state, it is possible to change the sensitivity to the focus position change in the operation unit 50, and it is possible to easily perform focusing even in a case where the focus range is extremely narrow.

Note that, in the present control, control for changing the focus position change coefficient is performed only when the operation speed of the operation unit 50 is equal to or less than the predetermined speed. However, control may be performed so that the focus position change amount is able to be changed regardless of the speed of the operation unit 50.

Second Exemplary Embodiment

Figure 7:
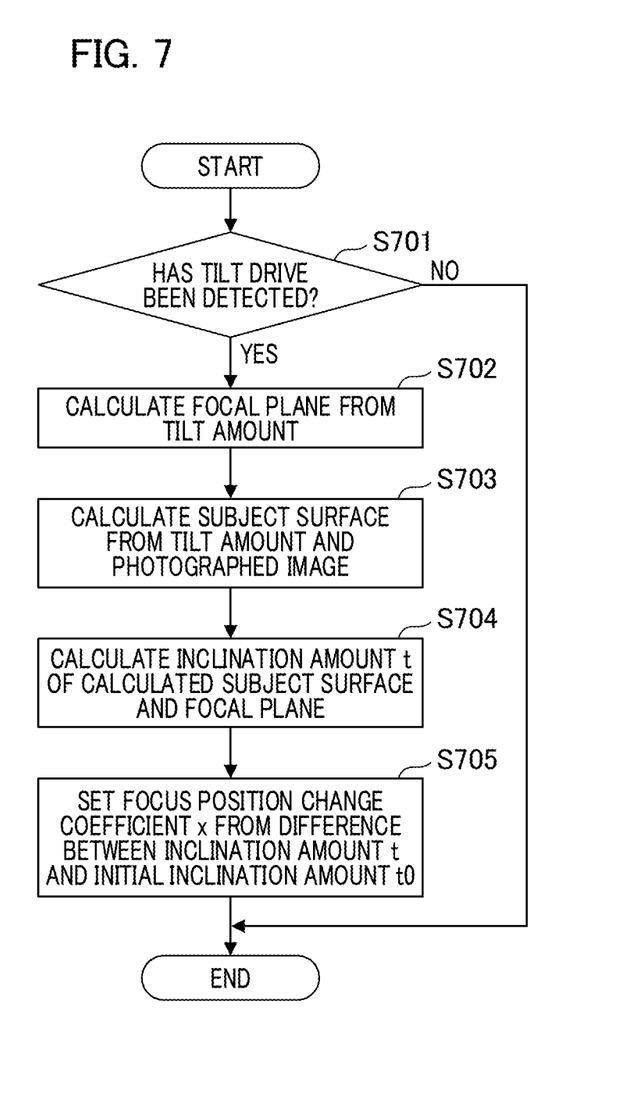
FIG. 7 is a flowchart for calculating the subject plane according to a second exemplary embodiment.

FIG. 7 is a flowchart for calculating the subject plane according to the second exemplary embodiment. The same configurations as those of the first exemplary embodiment are denoted by the same reference numerals, and descriptions thereof will be omitted. S701 to S705 in the present figure are able to be replaced with S410 to S413 in FIG. 4 in the first exemplary embodiment. In the present exemplary embodiment, the subject plane is calculated from the tilt amount of the optical system 20.

First, in S701, it is detected whether tilt drive is being performed. In a case where the tilt drive is not performed, control is ended. In a case where the tilt drive is performed, the process proceeds to S702. In step S702, the focal plane is calculated from the tilt amount according to the principle of Scheimpflug.

In S703, the subject plane is calculated from the tilt amount and the photographed image. A method of calculating the subject plane in S703 will be described using FIG. 3. Since the Formula (1) and Formula (3) are equal, the depth of field 217*a* and the depth of field 217*b* are equal, and the difference between the angle 216*a* and the angle 216*b* is the change angle 221*b* in the first exemplary embodiment, the following formula is established for the angle 216*a*.

$$216a = \arctan(\sin 221b/((218a-218b)/217a - \cos 221b)) \quad \text{(Formula 12)}$$

At this time, it is possible to calculate the change angle 221*b* from Scheimpflug's theorem by the tilt amount of the optical system 20, and it is possible to obtain the depth of field 217*a* from a state of a diaphragm mechanism (not shown) in the optical system 20. In addition, it is possible to calculate a difference between the focus range 218*a* and the focus range 218*b* by change of the focus range in the photographed image before and after the tilt. That is, it is possible to calculate the tilt of the focal plane and the subject plane, and it is possible to calculate the subject plane.

In S704, similarly to S412 of the first exemplary embodiment, the tilt amount t that is the angle between the subject plane and the focal plane is calculated from the subject plane calculated in S703. In S705, similarly to S413 of the first exemplary embodiment, the focus position change coefficient x is set from the difference between the initial tilt amount t0 and the tilt amount t according to the table of FIG. 5, and control is ended.

From the above, it is possible to detect the subject plane from a change in the focus range of the photographed image when the optical system 20 is inclined. That is, it is possible to determine whether or not the photographing is performed in the reverse tilt state when the tilt drive is performed, and it is possible to change the sensitivity to the focus position change of the operation unit 50.

Third Exemplary Embodiment

Figure 8:
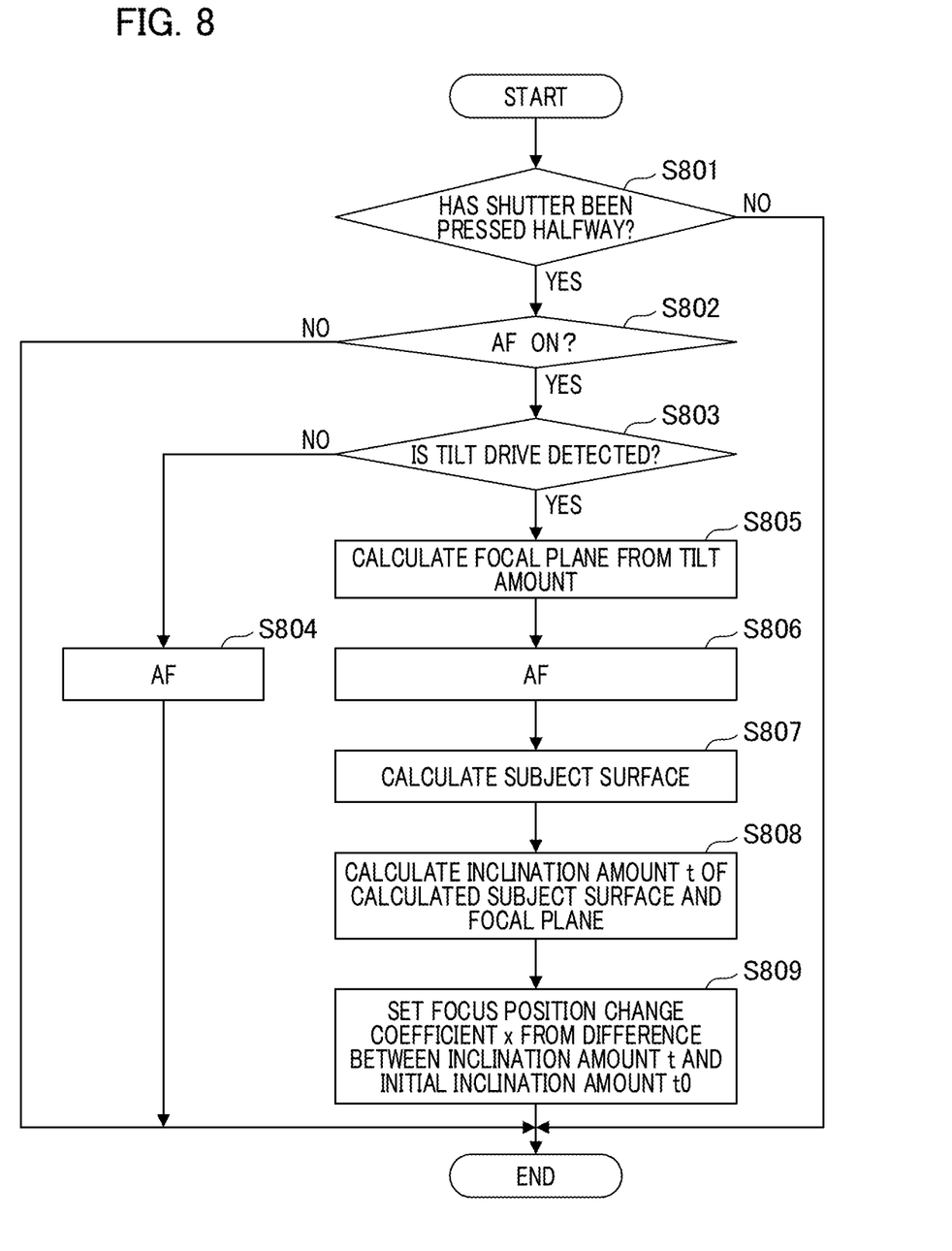
FIG. 8 is a flowchart illustrating control according to a third exemplary embodiment.

FIG. 8 is a flowchart illustrating control according to the third exemplary embodiment. In the present exemplary embodiment, control at a time of the AF will be described. First, in S801, it is determined whether a shutter button is depressed or not, and in a case where the shutter button is not depressed (No), control is ended. In a case where the shutter button is depressed (Yes), the process proceeds to S802.

In S802, it is determined whether an AF switch (not shown) is ON or OFF. In a case where the AF switch is ON (Yes), the process proceeds to S803, and in a case where the AF switch is OFF (No), control is ended. In S803, it is determined whether the tilt drive is detected. In a case where the tilt drive is not detected (No), the AF is performed in S804, and control is ended. In a case where the tilt drive is detected (Yes), the focal plane is calculated from the tilt amount in S805, and the process proceeds to S806.

Next, the AF is performed in S806, and the process proceeds to S807. In S807, the subject plane is calculated from a comparison between the driving of the focus lens 21 and the photographed image when the AF is performed in S806. Specifically, S807 is the same as S411 in FIG. 4 in the first exemplary embodiment.

In S808, a tilt amount t of an angle formed by a focused surface and a photographed surface is calculated from the subject plane calculated in S807 and the focal plane calculated in S805. In S809, similarly to S412, the focus position change coefficient x is set from the difference between the initial tilt amount t0 and the tilt amount t of the tilt direction according to the table of FIG. 5, and control is ended. Since control is similar to control of S408 in FIG. 4, details thereof will be omitted.

As described above, it is possible to detect the subject plane when the AF is performed. That is, it is possible to determine whether the photographing is performed in the reverse tilt state when the AF is performed, and it is possible to change the sensitivity to the focus position change of the operation unit 50 according to the angle formed by the focal plane and the subject plane. Therefore, it is possible to change the drive amount according to the focus range when fine adjustment of the focus is manually performed after the AF, and it is possible to easily perform fine adjustment of the focus even when the focus range is extremely narrow.

Other Exemplary Embodiments

Although the preferred exemplary embodiments of the present invention have been described above, the present invention is not limited to these exemplary embodiments, and various modifications and changes are possible within the scope of the gist thereof. In the above-described exemplary embodiment, in a case where the operation speed of the operation unit 50 is equal to or higher than a predetermined value, the focus position change coefficient is not changed. However, when the photographing in the reverse tilt state is detected regardless of the operation speed, the focus position change coefficient may be changed slightly.

In addition, in the above-described exemplary embodiment, the sensitivity to the focus position change of the operation unit 50 is reduced in photographing in the reverse tilt state. However, photographing of the tilt state may be detected and the sensitivity to the focus position change of the operation unit 50 may be increased at the time of tilt photographing.

As long as an apparatus is the imaging apparatus having the function according to the exemplary embodiments described above, the optical system 20 and the imaging element 10 may be detachably mounted on the camera body instead of the integral imaging apparatus, and the lens apparatus having the optical system 20 may be provided with the MPU, or the camera body having the imaging element 10 may be provided with the MPU.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-246911 filed on Dec. 22, 2017, which are hereby incorporated by reference herein in its entirety.

What is claimed is:

1. A lens apparatus comprising:
an imaging optical system including a plurality of lenses;
an operator;
a focus position changer configured to change a position of a focal plane by changing a position of at least one of the plurality of lenses according to an operation amount of the operator;
an operation amount detector configured to detect the operation amount;
a tilt changing unit configured to change a tilt of the focal plane by changing an inclination of the imaging optical system;
a tilt amount detector configured to detect a tilt amount including a tilt direction and a tilt angle of the imaging optical system; and
a controller configured to change a unit drive amount with respect to the operation amount in the focus position changer by using the tilt amount,
wherein the controller is configured to change the unit drive amount such that the focus position changer changes the position of the at least one of the plurality of the lenses (i) according to a first unit drive amount with respect to the operation amount based on a first detected tilt amount and (ii) according to a second unit drive amount with respect to the operation amount different from the first unit drive amount based on a second detected tilt amount different from the first detected tilt amount.

2. The lens apparatus according to claim 1, wherein the controller is configured to change the unit drive amount in a case where an operation speed of the operator is less than a threshold value.

3. The lens apparatus according to claim 1, wherein the controller is configured to obtain the tilt of the focal plane using the tilt amount and to change the unit drive amount according to a reference angle formed by the focal plane and a subject plane.

4. The lens apparatus according to claim 3, wherein the unit drive amount decreases in a case where the reference angle exceeds a reference value.

5. The lens apparatus according to claim 4, wherein the unit drive amount with respect to the operation amount decreases as the reference angle exceeds the reference value and as the reference angle becomes larger.

6. The lens apparatus according to claim 3, wherein the controller is configured to obtain a tilt of the subject plane using image information of a subject and the tilt amount.

7. The lens apparatus according to claim 3, wherein the controller is configured to obtain a tilt of the subject plane using image information of a subject and the drive amount of the imaging optical system driven by the focus position changer.

8. The lens apparatus according to claim 3, further comprising:
a touch panel configured to obtain information on the subject plane,
wherein the controller is configured to obtain a tilt of the subject plane using the information.

9. The lens apparatus according to claim 1, wherein the controller is configured to change the unit drive amount in a case where the operator is operated by a user.

10. An imaging system comprising:
a lens apparatus according to claim 1; and
an imaging element configured to capture an image by photoelectrically converting an image formed by the imaging optical system into an electric signal.

11. An imaging apparatus comprising:
an imaging optical system including a plurality of lenses;
an operator;
a focus position changer configured to change a position of a focal plane by changing a position of at least one of the plurality of lenses according to an operation amount of the operator;
an operation amount detector configured to detect the operation amount;
an imaging element configured to capture an image by photoelectrically converting an image formed by the imaging optical system into an electric signal;
a tilt changing unit configured to change a tilt of the focal plane by changing a tilt of the imaging element;
a tilt amount detector configured to detect a tilt amount including a tilt direction and a tilt angle of the imaging element; and
a controller configured to change a unit drive amount with respect to the operation amount in the focus position changer by using the tilt amount,
wherein the controller is configured to change the unit drive amount such that the focus position changer changes the position of the at least one of the plurality of the lenses (i) according to a first unit drive amount with respect to the operation amount based on a first detected tilt amount and (ii) according to a second unit drive amount with respect to the operation amount different from the first unit drive amount based on a second detected tilt amount different from the first detected tilt amount.

12. The imaging apparatus according to claim 11, wherein the controller is configured to change the unit drive amount in a case where an operation speed of the operator is less than a threshold value.

13. The imaging apparatus according to claim 11, wherein the controller is configured to obtain the tilt of the focal plane using the tilt amount and to change the unit drive amount according to a reference angle formed by the focal plane and a subject plane.

14. The imaging apparatus according to claim 13, wherein the drive amount decreases in a case where the reference angle exceeds a reference value.

15. The imaging apparatus according to claim 14, wherein the unit drive amount decreases as the reference angle exceeds the reference value and becomes larger.

16. The imaging apparatus according to claim 13, wherein the controller is configured to obtain a tilt of the subject plane using image information of a subject and the tilt amount.

17. The imaging apparatus according to claim 13, wherein the controller is configured to obtain a tilt of the subject plane using image information of a subject and the drive amount of the imaging optical system or the imaging element driven by the focus position changer.

18. The imaging apparatus according to claim 13, further comprising:
a touch panel configured to obtain information on the subject plane,
wherein the controller is configured to obtain a tilt of the subject plane using the information.

19. The imaging apparatus according to claim 11, wherein the controller is configured to change the unit drive amount in a case where the operator is operated by a user.

* * * * *